United States Patent [19]
Tümmler et al.

[11] 3,896,072
[45] July 22, 1975

[54] PROCESS OF MAKING AQUEOUS CO-POLYMER DISPERSION AND DISPERSION THEREFOR

[75] Inventors: Peter Tümmler; Herbert Zima, both of Graz, Austria

[73] Assignee: Vianova-Kunstharz A.G., Vienna, Austria

[22] Filed: July 2, 1974

[21] Appl. No.: 485,274

[30] Foreign Application Priority Data
July 3, 1973  Austria ............................ 5863/73
July 3, 1973  Austria ............................ 5864/73

[52] U.S. Cl.....260/29.6 TA; 117/132 C; 117/161 UT; 260/29.4 UA; 260/885; 260/80.75; 260/80.8; 260/80.81
[51] Int. Cl............................ C08f 1/13; C08f 45/26
[58] Field of Search .... 260/29.6 TA, 29.4 UA, 834, 260/836, 885, 901, 80.75, 80.8, 80.81

[56] References Cited
UNITED STATES PATENTS

| | | | |
|---|---|---|---|
| 3,057,812 | 9/1962 | Straughan et al. | 260/29.6 TA |
| 3,118,848 | 1/1964 | Lombardi et al. | 260/29.6 TA |
| 3,219,610 | 11/1965 | Tillson | 260/29.6 TA |
| 3,398,109 | 8/1968 | Hardy et al. | 260/29.4 UA |
| 3,505,128 | 4/1970 | Fujii et al. | 260/29.4 UA |

OTHER PUBLICATIONS
Grant, Julius, Hackh's Chemical Dictionary (1969) McGraw-Hill N.Y., pg. 642 relied on QD5H3.

*Primary Examiner*—Lucille M. Phynes
*Attorney, Agent, or Firm*—A. W. Breiner

[57] ABSTRACT

Aqueous cross-linking co-polymer dispersions are prepared using emulsion polymerization techniques with an anionic emulsifier from a monomer blend as follows:
  25 – 35 % by weight of butylmethacrylate
  10 – 25 % by weight of ethylhexylacrylate and/or n-butylacrylate
  10 – 20 % by weight methylmethacrylate
  10 – 20 % by weight styrol
  1 – 3 % by weight methyacrylic acid and/or acrylic acid
  10 – 25 % by weight polypropylene glycol monomethacrylate and/or polyethylene glycol monomethacrylate Paint compositions comprising the above dispersions and amine-formaldehyde resins have excellent weather resistance, flexibility, scratch resistance, adhesion, and freeness from craters.

11 Claims, No Drawings

PROCESS OF MAKING AQUEOUS CO-POLYMER DISPERSION AND DISPERSION THEREFOR

The present invention is directed to a process for producing aqueous cross-linking polymer dispersions primarily for use as stoving metal finishes in conjunction with water-soluble or water-dispersible amine resins.

According to conclusions and opinions set forth in the protective coating art, the advantages of aqueous dispersions, such as low viscosity combined with high solids; high molecular weight; no volatile toxic components, etc., are offset to a substantial degree by serious disadvantages of such systems, including swelling due to the water of the coatings, thereby reducing weather resistance, high porosity, low scratch resistance, and cratering on spray application. To find a solution to these disadvantages, specific polymer systems are described. Various prior art references describe heat-curable coating compositions which contain as the main binder or sole binder aqueous dispersions of co-polymers of acrylic monomers with co-polymerizable compounds. German Offenlegungsschrift No. 1,519,307 teaches aqueous alkaline polymer dispersions containing, in addition, aqueous aminoplasts, a coalescing agent, and a tertiary amine. The polymer dispersions are a blend of two co-polymers, one of them being based on (methylolated) (meth)acrylamide. German Auslegeschrift No. 1,269,337, and German Offenlegungsschrift Nos. 1,794,223 and 1,669,133 describe self-curing co-polymer dispersions based on N-methylolacrylamide or similar substances. German Auslegeschrift No. 1,248,194 describes co-polymer dispersions crosslinking with amine-formaldehyde or phenol-formaldehyde condensation products, the main monomers being $\alpha,\beta$-unsaturated carboxylic acid nitriles. In general, the aforesaid dispersions are not suitable for high quality metal finishes, e.g., automobile finishes, since they do not meet the requirements with respect to surface hardness, non-yellowing, high gloss, good gloss retention, and particularly flexibility and adhesion.

German Offenlegungsschrift No. 2,252,065 describes dispersions for metal finishes which contain two nitrogen-free monomer units, one of them being an unsaturated polyester with terminal hydroxy groups. According to this reference, use of such dispersions allows improvements in gloss as well as scratch resistance; however, the flexibility is only sufficient as a maximum, meaning that the practical use of the products is nearly ruled out.

According to the present invention, it has been found that a selection of specific monomers and specific weight ratios thereof provides aqueous dispersions which yield coating compositions with excellent performance in terms of flexibility, scratch resistance, weather resistance, adhesion, and freeness from craters. The process of the invention is characterized in that 25 – 35 % by weight of butylmethacrylate 10 – 25 % by weight of ethylhexylacrylate and/or n-butylacrylate 10 – 20 % by weight methylmethacrylate 10 – 20 % by weight styrol 1 – 3 % by weight methacrylic acid and/or acrylic acid 10 – 25 % by weight polypropylene glycol monomethacrylate and/or polyethylene glycol monomethacrylate are co-polymerized, using emulsion polymerization techniques, in the presence of anionic and, optionally, non-ionic emulsifiers and free radical initiators in known manner. The selection of the anionic emulsifiers is an important criterion for obtaining optimum results.

Deviations from the aforesaid co-monomers, as well as from the quantities thereof, have an adverse influence on the paint performance as well as on the stability of the dispersion. For instance, without a minimum amount of styrol the dispersion cannot be produced free from coagulates and it does not have sufficient stability. The other monomers cannot be exchanged for others without detrimental effects on the properties of the co-polymer. The use of polypropylene glycol monomethacrylate or polyethyleneglycol monomethacrylate is of special importance. Other hydroxyesters impart cracking to the drying film, reduce flow and flexibility; whereas the films produced from dispersions of the invention show excellent flexibility, smoothness, flow, and adhesion. The given weight ratios, in extreme cases, can be varied upward or downward by a maximum of 5 percent.

The dispersions of the invention, in mixture with water-soluble or water-dispersible amine resins, yield stoving finishes with superior performance regarding resistance to corrosion, chemicals, and mechanical influences.

Suitable anionic emulsifiers for use in preparing the co-polymers are hydrocarbon sulfonates, such as dodecylbenzolsulfonate, sodium laurylsulfate, sodium tridecylsulfate, or the sulfates of ethoxylated fatty alcohols, like sodium lauryl ethoxylate sulfate, or an octylphenol reacted with 2 mols ethylene oxide and sulfated. It is advantageous to co-employ non-ionic emulsifiers of the type of ethoxylated alkyl phenols together with the anionic emulsifiers. In order to further enhance the storage stability and pigment compatibility, further emulsifiers can be added towards the end of the polymerization reaction, e.g., an octylphenol reacted with 3 – 4 mols of ethylene oxide and sulfated subsequently, or a $C_{12} - C_{14}$ fatty alcohol reacted with 25 mols ethylene oxide, in quantities ranging from 0.2 – 0.5 percent or 2 – 4 percent of the total monomers.

The polymerization is carried out in known ways. For example, the total quantity of water, the emulsifiers, and initiators are charged to a reaction vessel, heated to 75°C., and the monomer blend is added within 1 – 2 hours. During the addition the temperature is raised to 85°C. At the end of the addition, optionally further emulsifiers are added, raising the temperature to 95°C.

The stoving coating compositions produced from the dispersions of the invention substantially contain the following ingredients, percentages relating to solids:

1. 60 – 95 % by weight of the dispersion designated hereinbefore,
2. 5 – 40 % by weight of a water-soluble and/or water-dispersible amine-formaldehyde condensation product, i.e., a cross-linking component, the methylol groups of which are partially or preferably completely etherified with monoalcohols,
3. 0 – 150 % by weight, preferably 0 – 80 percent by weight, of the total solids content of (1) and (2) of a pigment paste consisting of
   a. 4 – 70 % by weight of a pigment and/or filler, and b. 30 – 96 % by weight of a pigment wetting agent,
4. paint additives and/or curing catalysts and/or neutralizing agents.

Suitable cross-linking components are the water-soluble or at least water-dispersible amine formaldehyde condensates which are normally used in the paint industry, based on the aminotriazines, such as melamine, the benzoguanamine, etc., as well as urea, or similar substances. The substantially or completely etherified types, either as monomers or oligomers, are preferred, e.g., hexamethoxymethylmelamine.

Suitable pigments or fillers are those normally used by the paint industry. The quantities required for the various end uses and colors are known to those skilled in the art. Suitable pigment wetting agents can be chosen from a variety of groups including:

1. water-dilutable solution polymers of the acrylic type, either available on the market or produced in known manner. Those polymers are preferred which are formed from monomers similar to those of the binder dispersion, the proportion of (meth)acrylic acid being increased to provide sufficient solubility in water.

2. Acrylic resin dispersions produced according to the process of the invention, with 10 percent or more (meth)acrylic acid, and a reduced content of polypropylene or polyethyleneglycolmonomethacrylate.

3. Solutions of anionic and/or non-ionic emulsifiers in highboiling water-tolerant solvents, e.g., 2-dimethyl-4-oxymethyl-1,3-dioxolane, ethyleneglycolmonobutyletheracetate, ethylene glycolmonoethyl ether acetate, ethylene glycol monoethylether. The pigments, together with the pigment wetting agent, are dispersed with normal grinding equipment and are blended with the dispersion. (1) and (2) above are ideally suited for preparing stable pigment pastes with inorganic pigments.

The following preparations and examples illustrate the invention without limiting the scope thereof. Parts are by weight.

EXAMPLE 1

In a polymerization reaction vessel;
 a. 2.9 parts dodecylbenzolsulfonate
 9.8 parts ethoxylated octylphenol (with 16 mols ethylene oxide)
 2 parts ammonium persulfate
are dissolved in 1090 parts deionized water. The solution is heated to 75°C., and the following blend (b) is continuously added over a period of 90 minutes:
 b. 265 parts butylmethacrylate
 140 parts ethylhexylacrylate
 141 parts methylmethacrylate
 141 parts styrol
 190 parts propyleneglycolmonomethacrylate
 15 parts methacrylic acid
 4.4 parts dodecylmercaptan
During the addition the temperature is slowly raised to 85°C. After the addition, 28 parts of a $C_{12}$ – $C_{14}$ fatty alcohol reacted with 25 mols ethylene oxide and 3 parts of an octylphenol which was reacted with 3 mols ethylene oxide and subsequently sulfated, dissolved in 100 parts water, are added. To complete conversion, the temperature is raised to 95°C., and held for 10 minutes. After cooling, a highly stable dispersion with about 44 percent solids is obtained.

For further processing the pH-value of the dispersion is adjusted to 7.5 with an alkanol amine, e.g., dimethylethanolamine.

EXAMPLE 2

Analogous to Example 1, a polymer dispersion is produced using the following blend (b):
 b. 265 parts butylmethacrylate
 126 parts n-butylacrylate
 155 parts methylmethacrylate
 141 parts styrol
 190 parts polypropyleneglycolmonomethacrylate
 15 parts methacrylic acid
 4.4 parts tert.dodecylmercaptan

EXAMPLE 3

Analogous to Example 1, a polymer dispersion is prepared using the following blends (a) and (b):
 a. 3 parts sodiumlaurylethoxylatesulfate
 9.8 parts ethoxylated octylphenol (with 16 mols ethylene oxide)
 2 parts ammoniumpersulfate
 1090 parts deionized water
 b. 225 parts butylmethacrylate
 225 parts ethylhexylacrylate
 162 parts methylmethacrylate
 180 parts styrol
 90 parts polypropyleneglycol monomethacrylate
 18 parts acrylic acid
 4.4 parts tert.dodecylmercaptan

EXAMPLE 4

Analogous to Example 1, the following blends (a) and (b) are polymerized:
 a. 3.0 parts of an octylphenol reacted with 2 mols ethylene oxide and subsequently sulfated
 9.8 parts of an ethoxylated octylphenol (with 16 mols ethylene oxide)
 2 parts ammoniumpersulfate
 1090 parts deionized water
 b. 320 parts butylmethacrylate
 90 parts ethylhexylacrylate
 90 parts methylmethacrylate
 180 parts styrol
 180 parts polypropyleneglycolmonomethacrylate
 30 parts methacrylic acid
 4.4 parts tert.dodecylmercaptan The polypropylene glycolmonomethacrylate can be replaced by the same quantity of polyethylene glycol monomethacrylate. The obtained results are comparable.

The preparation of pigment pastes for use in paint compositions demonstrating this invention is shown in Table I hereinafter.

TABLE I

| Number | Pigment of Wetting Agent | Preparation of Pigment Paste Pigment | Mill Type |
|---|---|---|---|
| I | 148.5 parts acrylic resin/65%[(a)]<br>237.5 parts butylglycolacetate[2]<br>11.0 parts dimethylethanolamine[3] | 386 parts TiO$_2$-rutile | ball mill with steatite balls (15 hours) |
| II | 161 parts acrylic resin/60%[(b)]<br>225 parts ethylglycol[2(a)]<br>10 parts dimethylethanolamine[3] | 386 parts molybdatered | As in I (10 hours) |
| III | As in I | 58 parts pigment blue[4] 15 No. 74160 | As in I (60 hours) |
| IV | As in I | 58 parts carbon black | As in I (80 hours) |
| V | 350 parts acrylic dispersion[5] 28 % in water | 392 parts molybdatered | As in I (10 hours) |
| VI | 74.4 parts 2-dimethyl-4-oximethyl-1,3-dioxalane<br>12.8 parts dodecylbenzylsulfonate<br>12.8 parts ethoxylated cetyl alcohol (25 ethylene oxide) | 200 parts molybdatered | three roll |
| VII | As in VI | 200 parts TiO$_2$-rutile | As in VI |
| VIII | As in VI | 50 parts pigment blue 15 No. 74160 | As in VI |
| IX | 170 parts acrylic resin[(c)] 56.7% in butylglycolacetate<br>216 parts butylglycolacetate<br>11 parts dimethylethanolamine | 386 parts TiO$_2$-rutile | As in I (15 hours) |

[1]Acrylic resin [(a)] is a self-reacting water-soluble acrylic polymer prepared according to Austrian Patent Specification No. 291,571; acrylic resin [(b)] is a self-reacting water-soluble acrylic polymer on the basis of methylolated acrylamide; acrylic resin [(c)] is a water-soluble acrylic polymer on the basis of the monomers blend of Example 1, with 9% methacrylic acid and 12 percent polypropylene glycolmonomethacrylate.
[2] monoethyleneglycolmonobutylether acetate
[2(a)]monoethyleneglycol monoethyl ether
[3]salt formation for obtaining solubility in water
[4]according to Color Index
[5]dispersion according to Example 1 with 9 percent methacrylic acid and 12 percent polypropylene glycolmonomethacrylate
For tinting the paints pigmented with organic pigments, available pigment preparations in form of pastes for aqueous media (e.g., "Colanyl" or "Teig-P-Pigmente") can also be used.

Paint preparations based on this invention, and the pigment pastes of Table I are set forth in Table II hereinafter.

water such that an end viscosity of about 25 s DIN 53 211 is obtained.

The various paints prepared according to Table II

TABLE II

| Preparations | 1 | 2 | 3 | 4 | 5 | 6 | 7 | 8 | 9 | 10 | 11 | 12 |
|---|---|---|---|---|---|---|---|---|---|---|---|---|
| Pigment Paste I | 33.2 | — | 33.2 | — | — | — | — | 33.2 | 33.2 | 33.2 | 33.2 | — |
| Pigment Paste II | — | 33.2 | — | — | — | — | — | — | — | — | — | — |
| Pigment Paste III | — | — | 10 | — | — | — | — | — | — | — | — | — |
| Pigment Paste IV | — | — | — | — | — | — | — | — | — | 5 | — | — |
| Pigment Paste V | — | — | — | 30.3 | — | — | — | — | — | — | — | — |
| Pigment Paste VI | — | — | — | — | 24 | — | — | — | — | — | — | — |
| Pigment Paste VII | — | — | — | — | — | 24 | 24 | — | — | — | — | — |
| Pigment Paste VIII | — | — | — | — | — | — | 39 | — | — | — | — | — |
| Pigment Paste IX | — | — | — | — | — | — | — | — | — | — | — | 33.2 |
| Acrylic dispersion, 43.2% of Example 1 | 65 | 65 | 60 | 65 | 74 | 74 | 74 | — | — | — | 62 | — |
| Acrylic dispersion, 44% of Example 2 | — | — | — | — | — | — | — | 65 | — | — | — | — |
| Acrylic dispersion, 41.5% of Example 3 | — | — | — | — | — | — | — | — | 69 | — | — | — |
| Acrylic dispersion, 45% of Example 4 | — | — | — | — | — | — | — | — | — | 64 | — | 64 |
| hexamethoxymethyl-[1] melamine, 100% | 8 | 8 | 8 | 8 | 8 | 8 | 8 | 8 | 8 | 8 | 8 | 8 |
| water | 11 | 13 | 12 | 12 | 14 | 12 | 11 | 12 | 12 | 13 | 14 | 8 |
| p-toluol sulfonic-acid 10%, in water | 1.6 | 1.6 | 1.6 | 1.6 | 1.6 | 1.6 | 1.6 | 1.6 | 1.6 | 1.6 | 1.6 | 1.6 |

[1]Hexamethoxymethylmelamine can optionally be dissolved in suitable solvents in order to render more handleable the crystalline types.
Amounts are parts by weight.
%,where indicated, 15% solids, or non-volatile.

In preparations 1 – 12 of Table II, the paints are prepared as follows:

With constant stirring the pigment paste is blended with the aqueous acrylic dispersions of the invention; neutralized to a pH-value of 7.5 with dimethylethanolamine, the amine resin solution, a curing catalyst and were evaluated, the results tabulated in Tables III and IV hereinafter. Table IV is data on corrosion tests. Unless otherwise stated, the paints are sprayed onto clean untreated steelpanels (0.8 mm) and stoved for 30 minutes at 160°C.

TABLE III[1]

| film thickness/$\mu^m$ | 40 | 38 | 40 | 36 | 40 | 41 | 39 | 38 | 40 | 45 | 40 | 42 |
|---|---|---|---|---|---|---|---|---|---|---|---|---|
| Erichsen indentation | 7.4 | 7.2 | 7.5 | 7.9 | 8.1 | 7.8 | 7.9 | 8.1 | 7.6 | 7.8 | 7.4 | 7.6 |
| crosshatch DIN 53 151 | 1–2 | 1–2 | 1–2 | 1 | 1–2 | 1–2 | 1–2 | 1 | 2–3 | 2 | 1–2 | 2 |
| impact[2] | 70 | 65 | 70 | 75 | 75 | 75 | 75 | 80 | 80 | 75 | 70 | 70 |
| gloss (Gonio-[3] photometer GP 2/45°) | 79 | 80 | 81 | 77 | 85 | 81 | 79 | 81 | 89 | 85 | 79 | 81 |
| pendulum hardness DIN 53 157, Konig | 151 | 156 | 150 | 162 | 156 | 145 | 165 | 139 | 102 | 142 | 151 | 145 |
| mandrel ASTM D 522 - 41 | 32 | 32 | 32 | 32 | 32 | 32 | 32 | 32 | 32 | 32 | 32 | 32 |
| xylol test[4] (xylol soaked cotton pad) after 4 minutes | U-1 | U-1 | U-1 | U-1 | U-1 | U-1 | U-1 | U-1 | U-1 | U-1 | U-1 | U-1 |

[1]The evaluated paint films were sprayed onto untreated steel panels of 0.8 mm thickness and cured at 160°C. for 30 minutes.
[2]Gardner impact, inch × pounds.
[3]Gloss with goniophotometer GP at 45° — gloss = (sample/reading)/(standard/100 parts)
[4]Xylol test:
U: no attack after indicated time, film not swollen, cannot be scratched off with fingernail.
1 : slightly swollen after indicated time, can be scratched off with some effort.
2 : slightly swollen after indicated time, can be scratched off easily.
3 : strongly swollen after indicated time, film crinkles and starts to peel off.
4 : film almost dissolved, tacky, can be wiped off.

TABLE IV[5]

| | 1 | 2 | 3 | 4 | 5 | 6 | 7 | 8 | 9 | 10 | 11 | 12 |
|---|---|---|---|---|---|---|---|---|---|---|---|---|
| tropical test 500 hours | m1 g1 | m1 g1 | m1 g1 | m1 g1 | m1 g1 | m1 g1 | m1 g1 | m1 g1 | m3 g2 | m2 g1 | m1 g1 | m2 g1 |
| Kesternich corrosion test[5] (0.2 l $SO_2$) | no attack | | | | | | | | m3 g1 | | no attack | |
| salt spray resistance ASTM B 117–64 550 hours | m2 g1 | m2 g1 | m2 g1 | m2 g1 | m2 g1 | m2 g1 | m2 g1 | m3 g2 | m3 g2 | m2 g2 | m2 g1 | m2 g1 |
| water soak at 40°C. 350 hours | | | | m1 g1 | | | | | m4 g2 | m2 g2 | m1 g1 | m2 g1 |

[5]Corrosion tests were run on Zink Bonder No. 125 panels, with an anti-corrosion primer applied by electrodeposition and wet-sanded with emery wet paper No. 600.

It is claimed:

1. Process for producing aqueous cross-linking co-polymer dispersions for stoving metal finishes comprising emulsion co-polymerizing monomers as follows
   25 – 35 % by weight of butylmethacrylate
   10 – 25 % by weight of ethylhexylacrylate and/or n-butylacrylate
   10 – 20 % by weight of methylmethacrylate
   10 – 20 % by weight of styrol
   1 – 3 % by weight of methacrylic acid and/or acrylic acid
   10 – 25 % by weight of polypropylene glycol-monomethacrylate and/or polyethylene glycol-monomethacrylate
   the total monomer content, within said ranges, being 100 %, in the presence of an anionic emulsifier.

2. The process of claim 1 wherein the anionic emulsifier is selected from the group consisting of hydrocarbon sulfonates, sulfates of ethoxylated fatty alcohols, and an octylphenol reacted with two mols of ethylene oxide and subsequently sulfated.

3. The process of claim 2 wherein a non-ionic emulsifier is used in admixture with the anionic emulsifier.

4. The process of claim 3 wherein the non-ionic emulsifier is an ethoxylated alkylphenol.

5. The process of claim 3 wherein the non-ionic emulsifier is a free radical initiator.

6. The process of claim 1 wherein a blend of the monomers is formed and the blend is added to the emulsifier.

7. The process of claim 6 wherein a non-ionic emulsifier is used in combination with the anionic emulsifier.

8. The process of claim 7 wherein the blend of monomers is added to the admixture of emulsifiers while raising the temperature thereof to approximately 85°C., and after the monomer blend has been completely added adding an additional emulsifier.

9. The process of claim 8 wherein the additional emulsifier is an octylphenol reacted with 3 - 4 mols ethylene oxide and subsequently sulfated, or a $C_{12} - C_{14}$ fatty alcohol reacted with 25 mols ethylene oxide.

10. An aqueous cross-linkable dispersion which is a co-polymer prepared by emulsion co-polymerizing monomers as follows
    25 – 35 % by weight of butylmethacrylate
    10 – 25 % by weight of ethylhexylacrylate and/or n-butylacrylate
    10 – 20 % by weight of methylmethacrylate
    10 – 20 % by weight of styrol
    1 – 3 % by weight of methacrylic acid and/or acrylic acid
    10 – 25 % by weight of polypropylene glycol-monomethacrylate and/or polyethylene glycol-monomethacrylate
    the total monomer content, within said ranges, being 100 %, in the presence of an anionic emulsifier.

11. An aqueous cross-linkable dispersion which is a co-polymer of monomers as follows
    25 – 35 % by weight of butylmethacrylate
    10 – 25 % by weight of ethylhexylacrylate and/or n-butylacrylate
    10 – 20 % by weight of methylmethacrylate
    10 – 20 % by weight of styrol
    1 – 3 % by weight of methacrylic acid and/or acrylic acid
    10 – 25 % by weight of polypropylene glycol-monomethacrylate and/or polyethylene glycol-monomethacrylate the total monomer content within the co-polymer, within said ranges, being 100 %.

* * * * *